(12) United States Patent
Itoh

(10) Patent No.: US 6,205,089 B1
(45) Date of Patent: *Mar. 20, 2001

(54) COMMUNICATION TERMINAL APPARATUS AND COMMUNICATION CONFERENCE SYSTEM

(75) Inventor: Kan Itoh, Machida (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/297,180

(22) Filed: Aug. 29, 1994

(30) Foreign Application Priority Data

Aug. 30, 1993 (JP) .................................................. 5-214374
Aug. 23, 1994 (JP) .................................................. 6-198344

(51) Int. Cl.⁷ ............................. G04B 47/00; G04B 19/24
(52) U.S. Cl. ................................................. 368/10; 368/28
(58) Field of Search .................................. 368/10, 28, 29; 358/85, 86, 146, 181; 364/518, 521, 565, 705.07, 705.08; 379/53, 54

(56) References Cited

U.S. PATENT DOCUMENTS

| | | | |
|---|---|---|---|
| 4,725,886 | * 2/1988 | Galumbeck et al. ................. | 358/147 |
| 4,774,658 | * 9/1988 | Lewin ................................... | 364/200 |
| 4,831,552 | * 5/1989 | Scully et al. ......................... | 364/518 |
| 4,882,743 | * 11/1989 | Mahmoud ............................. | 379/53 |
| 4,977,529 | * 12/1990 | McGaughey et al. ................ | 364/521 |
| 4,987,492 | * 1/1991 | Stults et al. ........................... | 358/181 |
| 4,995,071 | 2/1991 | Weber et al. ......................... | 379/53 |
| 5,062,136 | * 10/1991 | Gattis et al. ........................... | 380/18 |
| 5,375,018 | * 12/1994 | Klaussner et al. .................... | 365/47 |
| 5,375,104 | * 12/1994 | Ishii et al. ............................. | 368/22 |
| 5,396,269 | * 3/1995 | Gotoh et al. .......................... | 384/14 |
| 5,402,394 | * 3/1995 | Turski ................................... | 368/10 |
| 5,455,807 | * 10/1995 | Neddle et al. ........................ | 368/47 |

FOREIGN PATENT DOCUMENTS 0349709   1/1990   (EP) .
6225301   8/1994   (JP) .

* cited by examiner

*Primary Examiner*—Vit Miska
(74) *Attorney, Agent, or Firm*—Fitzpatrick, Cella, Harper & Scinto

(57) ABSTRACT

A calendar clock generates a local calendar and date information of the self station to easily obtain local date information of a communication partner. The calendar includes individual information such as holidays, public holidays, and summer time. A time difference conversion circuit converts the date information sent from the communication partner into local date information of the self station.

17 Claims, 7 Drawing Sheets

COMMUNICATION TERMINAL APPARATUS AND COMMUNICATION CONFERENCE SYSTEM

BACKGROUND OF THE INVENTION

1. Field of the Invention

The present invention relates to a communication terminal apparatus and a communication conference system, which allow easy schedule adjustment between communication terminal apparatuses.

2. Related Background Art

Digital communication lines have been popular recently, and a great deal of attention has been given to a TV telephone/conference system using a digital line network. Standardization is a prerequisite for the popularization of a communication system. There are five recommendations as to video and voice communications, namely recommendation H. 221 specifying the frame structure of 64 kbit/s to 1,920 kbit/s channels; recommendation H. 230 specifying a control signal for frame synchronization and a notification signal; recommendation H. 242 specifying an interconnection procedure up to 2 Mbit/s; recommendation H. 261 specifying a video coding scheme for P×64 kbit/s (P=1 to 30); and recommendation H. 320 specifying the arrangement of a voice/video communication system.

FIG. 6 is a block diagram showing the schematic arrangement of a conventional TV conference terminal apparatus. Referring to FIG. 6, this apparatus includes a video camera 10 for photographing, e.g., participants in a conference at a self station, a monitor 12 for displaying images photographed at the self station and/or stations participating in a conference, a speaker 14, a microphone 16, an operation unit 18 for performing control, e.g., panning, tilting, and zooming, of a camera 10 in a self station and cameras in other stations, switching control of the cameras, and the like, input/output equipment terminals 20 including a keyboard of a computer, a still picture input device, a pointing device for inputting plotting pictures, such as a mouse or digitizer, a sub-monitor for displaying images from other auxiliary equipment, and a main body 22 of the TV conference system.

FIG. 7 shows the detailed arrangement of the main body 22. Referring to FIG. 7, a video I/F 30 serves to connect the camera 10 and the monitor 12 to the main body 22. The video I/F 30 has image processing functions of performing screen division, image synthesis, character synthesis, and the like. A video coder/decoder (CODEC) 32 codes a video signal from the video I/F 30 and decodes received coded video information.

A voice I/F 34 serves to connect the speaker 14 and the microphone 16 to the main body 22, and has voice processing functions such as an echo cancel function. A voice coder/decoder (CODEC) 36 codes a voice signal from the voice I/F 30 and decodes the received coded voice information. A delay circuit 38 delays coded voice information obtained by the voice CODEC 36 and received coded voice information by a predetermined period. The delay circuit 38 serves to synchronize voice information to video information.

A computer 40 provides a TV conference function and a computer conference function. A still picture/plotting picture control circuit 42 controls the still picture input/output operation and plotting picture input/output operation of the auxiliary input/output equipment terminal 20. A data port 46 performs data transfer between the main body 22 and the auxiliary input/output equipment terminal 20 via the computer 40, the still picture/plotting picture control circuit 42, and an auxiliary equipment control circuit 44.

An interconnection procedure control circuit 48 controls interconnection with other TV conference terminals via a network. A network signal control circuit 50 performs end/end control to establish a common mode for communications between terminals. A communication control circuit 52 performs overall communication control by using the interconnection procedure control circuit 48 and the network signal control circuit 50.

A multiplexing and demultiplexing circuit 54 performs multiplex transmission of data. A network I/F 56 serves to connect a communication network 58 to the main body 22. An inter-multipoints control circuit 60 interconnects TV conference terminals at multiple points to allow a TV conference between the multiple points. An operation unit input I/F 62 receives various commands from the operation unit. An input control unit 64 outputs a command to each component of the self station in accordance with a designation of the operation unit input I/F 62.

When a conference is to be held by using a communication conference system such as the TV conference system described above, schedule adjustment between communication terminals must be performed.

More specifically, the communication terminals negotiate with each other about the date of the conference and the time which can be spared for the conference, thereby performing schedule adjustment. If, however, an international conference is to be held, the working days and hours in each country participating in the conference, time differences, and the like must be considered. In this case, mistakes tend to occur. Especially when terminals belonging to a plurality of countries participate in a conference, communications for schedule adjustment alone cost a great deal.

SUMMARY OF THE INVENTION

It is an object of the present invention to provide a communication terminal apparatus and a communication conference system which can solve the above problems.

It is another object of the present invention to provide a communication terminal apparatus and a communication conference system which can easily perform schedule adjustment.

In order to achieve the above objects, according to a preferred embodiment of the present invention, there is provided a communication terminal apparatus included in a plurality of communication terminal apparatuses for holding a communicating conference therebetween, characterized in that the communication terminal apparatus comprises generating means for generating date data corresponding to a self station, and transmitting means for transmitting the date data generated by the generating means to at least one of the plurality of communication terminal apparatuses.

It is still another object of the present invention to provide a communication terminal apparatus and a communication conference system in which mistakes are not easily caused in performing communication schedule adjustment.

It is still another object of the present invention to provide a communication terminal apparatus and a communication conference system which can reduce the communication cost required for communication schedule adjustment.

It is still another object of the present invention to provide a communication terminal apparatus and a communication conference system which have novel functions.

Other objects and features of the invention will become apparent from the following detailed description of the embodiments taken in conjunction with the accompanying drawings.

DETAILED DESCRIPTION OF THE PREFERRED EMBODIMENTS

An embodiment of the present invention will be described below with reference to the accompanying drawings.

Figure 1:
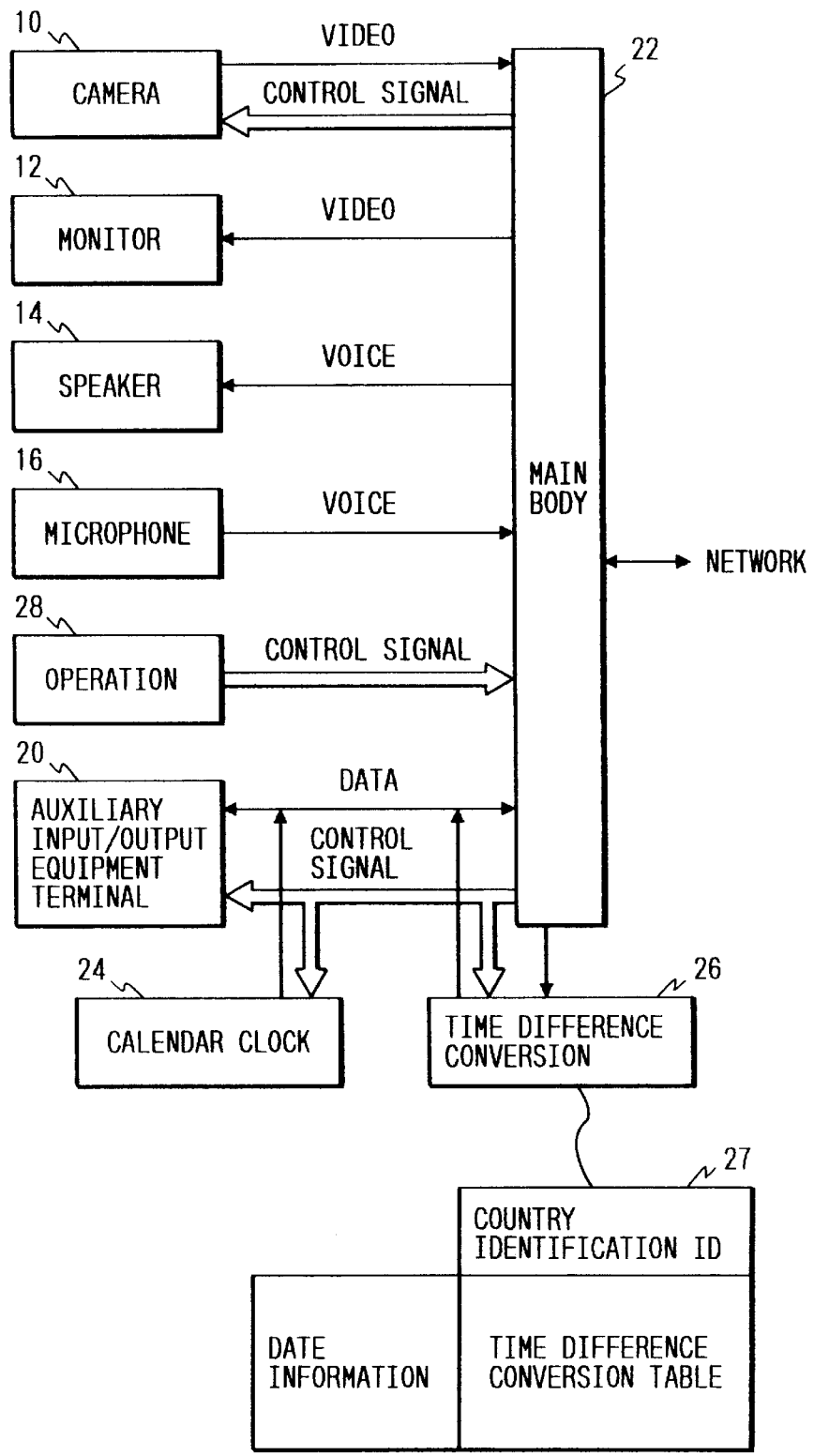
FIG. 1 is a block diagram showing the schematic arrangement of an embodiment of the present invention.
Figure 6:
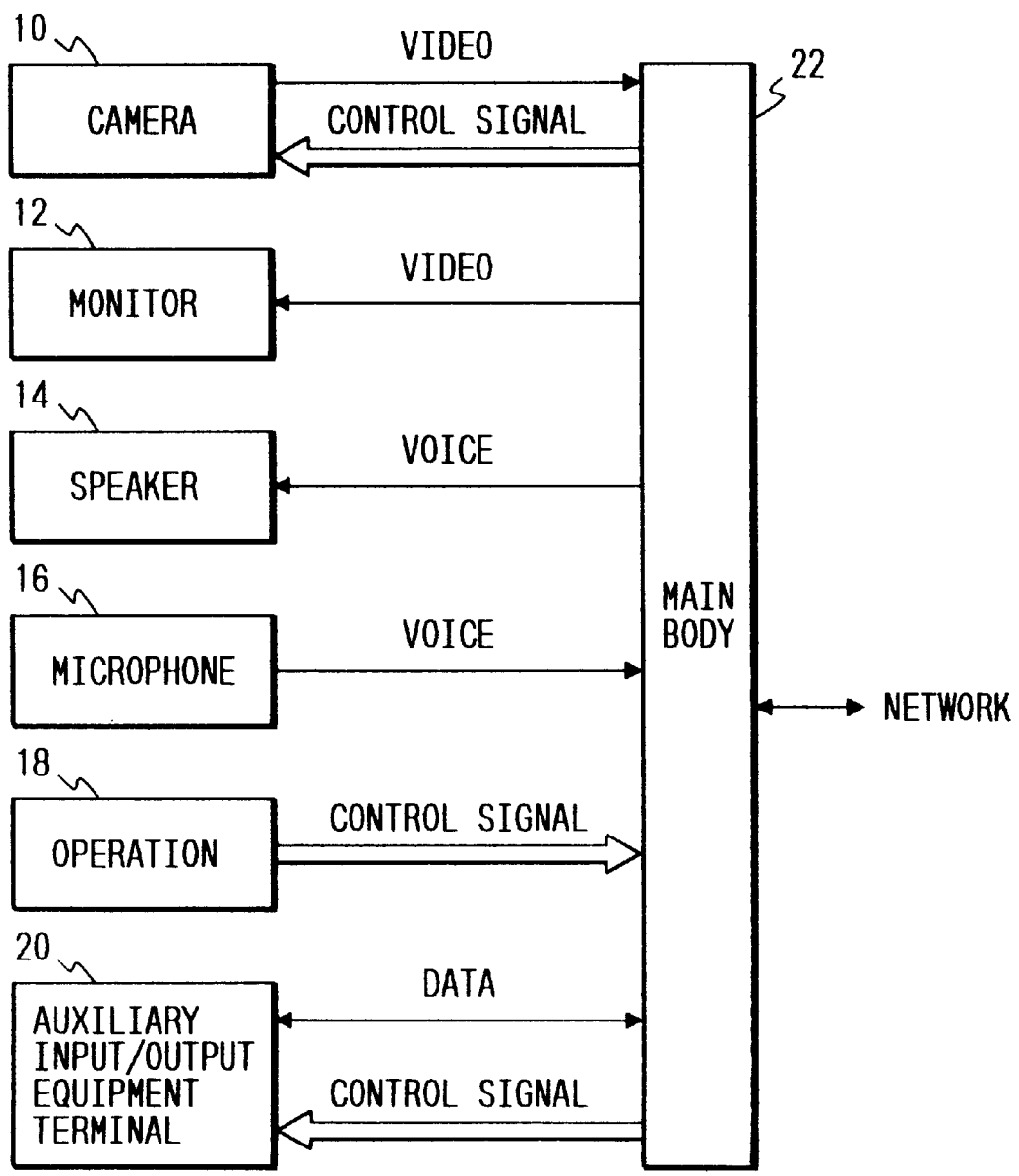
FIG. 6 is a block diagram showing the schematic arrangement of a conventional system.
Figure 7:
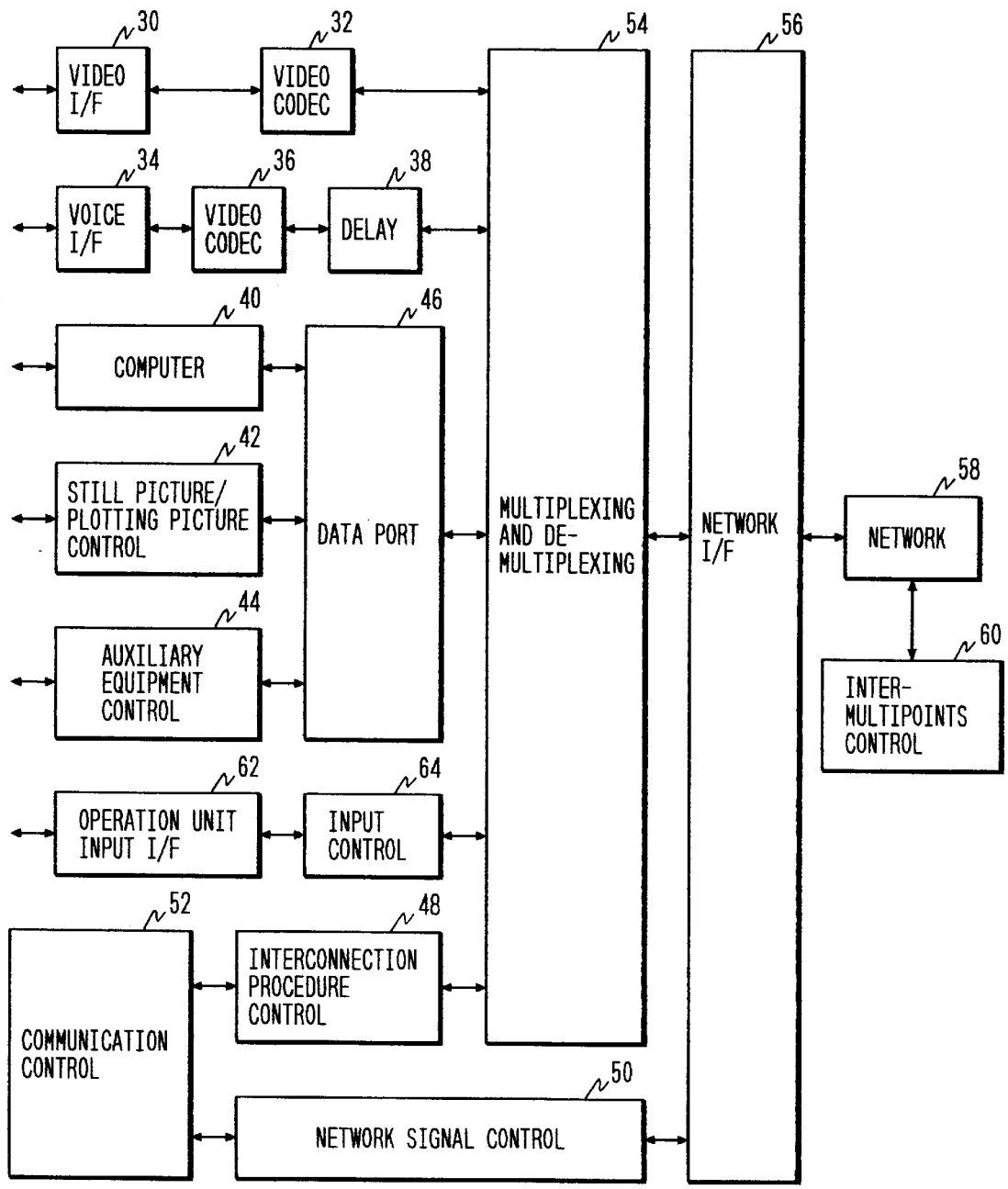
FIG. 7 is a block diagram showing the schematic arrangement of a main body 22.

FIG. 1 is a block diagram showing the schematic arrangement of a TV conference terminal according to an embodiment of the present invention. The same reference numerals in FIG. 1 denote the same parts as in FIG. 6, and a description thereof will be omitted. Referring to FIG. 1, this terminal includes a calendar clock 24 and a time difference conversion circuit 26. The calendar clock 24 stores calendar information of the self station and year/month/day/time information in a ROM (not shown). The calendar clock 24 has a RAM (not shown) capable of writing and reading the determined schedule information of a TV conference therein and therefrom, and outputting information, as needed. The time difference conversion circuit 26 stores the time differences between the home country and other countries, and has a time difference conversion table 27 for converting date information of a partner's country sent from a partner's station into date information of the home country by using the ID information and date information of the partner's country as an address of the table.

FIGS. 2, 3, 4, and 5 show examples of how date information is displayed in this embodiment. Characteristic operations of the embodiment will be described below with reference to FIGS. 2 to 5.

When a calendar is required in the process of a conference (e.g., in determining a conference schedule), the calendar is read out from the ROM in the calendar clock 24 in accordance with a designation from an operation unit 28 and is displayed on the submonitor of an auxiliary input/output equipment terminal 20. In some case, calendar data of the self station is sent to a partner's station to be displayed on its submonitor. In contrast to this, calendar data of the partner's station may be read out from a calendar clock 24 of the partner's station, received, and displayed on the submonitor of the self station or the partner's station.

Figure 2:
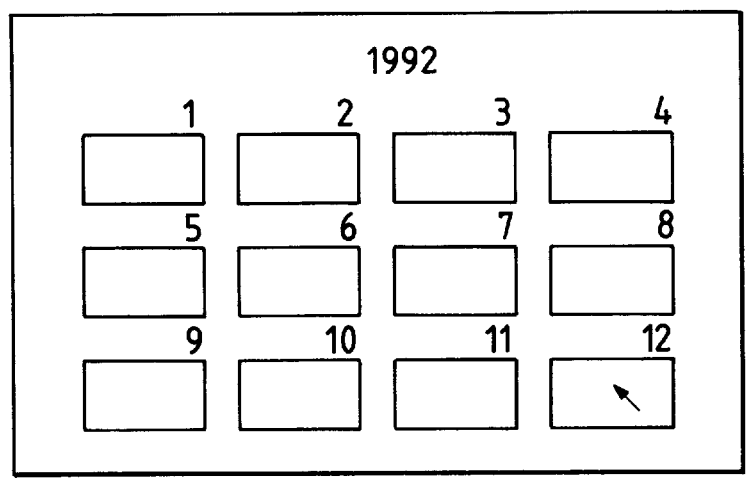
FIG. 2 is a view showing a displayed state of an yearly calendar according to the embodiment.

FIG. 2 shows an example of display. As shown in FIG. 2, an yearly calendar (1992 calendar in FIG. 2) including the current day is displayed in accordance with a designation from the operation unit 28. If December is selected by using a pointing device of the auxiliary input/output equipment terminal 20, a monthly calendar of December is displayed. In this case, a monthly calendar of December is also displayed in the partner's station. The displayed contents reflect holidays and public holidays in each country in accordance with the time difference conversion circuit 26.

Figure 3:
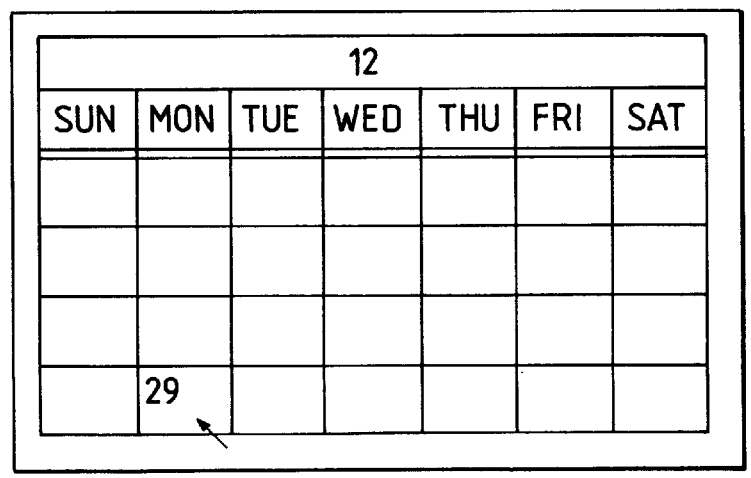
FIG. 3 is a view showing a displayed state of a monthly calendar according to the embodiment.
Figure 4:
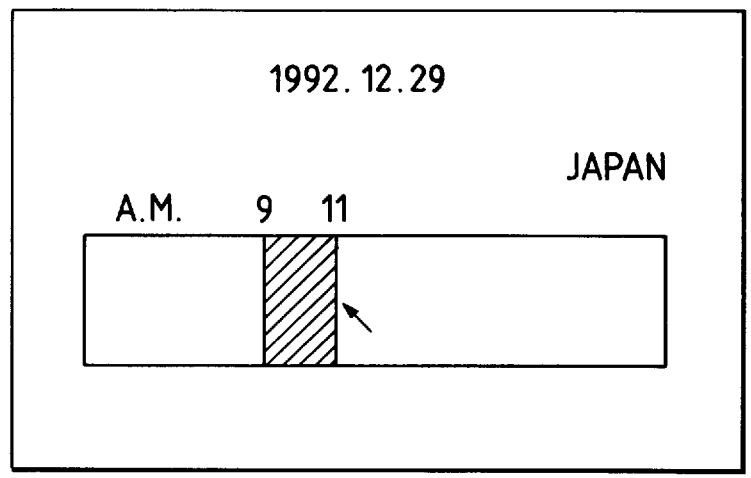
FIG. 4 is a view showing a displayed state of a timetable of Japan according to the embodiment.
Figure 5:
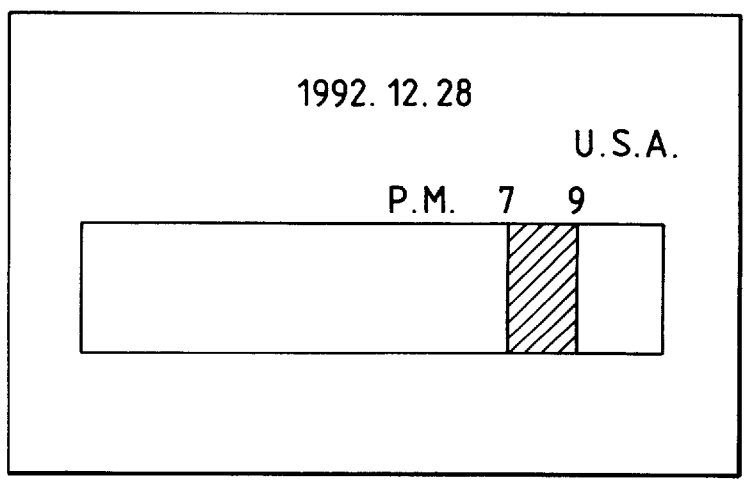
FIG. 5 is a view showing a displayed state of a timetable obtained by converting the timetable in accordance with U.S.A. time.

Assume that the 29th day is selected on the submonitor in the state shown in FIG. 3 by using the pointing device. In this case, as shown in FIG. 4, the timetable of the 29th day is displayed. If, for example, "9:00–11:00 A.M." in Japan is selected, as shown in FIG. 4, ID information indicating the transmission side, i.e., Japan, and year/month/day/time information are sent to the partner's station in accordance with the selection, and the time data is converted into time data corresponding to the country of the partner's station by a time difference conversion circuit 26 of the partner's station and displayed, as shown in FIG. 5. If, for example, the partner's station is in the eastern part of the U.S.A, "7:00–9:00 P.M." on December 28 is displayed, In addition, date information set before time difference conversion by the time difference conversion circuit 26 is preferably displayed on the submonitor at the same time. With this operation, the date information of the communication partner in the partner's country can be known on the screen. Therefore, schedule adjustment can be performed by comparing the year/month/day/time information of the communication partner with the year/month/day/time of the self station. Furthermore, a TV conference terminal is shared by a plurality of persons. If, for example, determined schedule information, e.g., the expected date of a conference, is written in the RAM in the calendar clock 24 in addition to the calendar display, an operator at each station can run through the operation schedule of the TV conference system by displaying the calendar on the submonitor. In addition, the operator can see the conference schedule of each station to prevent overlapping of expected operation times. By displaying expected TV conference system operation information on the partner's station, the schedule of the partner's station can also be checked, thereby facilitating determination of the date of the next conference. In this case, the detailed contents of the schedule can be masked with respect to the partner's station. Furthermore, individual schedule information in the electronic notebook of each user can be written in the RAM in the calendar clock 24 via an interface (not shown) of the auxiliary input/output equipment terminal 20, and can be displayed on the monitors in the self station and the partner's station. In this case, the schedule information can be transmitted while the detailed contents of the schedule of the self station are masked in accordance with the operation of the operation unit 28. With this operation, schedule adjustment can be performed while the user in the self station sees the contents of the schedule on the monitor in the self station, and the communication partner checks the presence/absence of free time in the schedule information received from the self station. Therefore, schedule adjustment can be performed while a change in the schedule is considered in accordance with the contents of the schedule.

In addition, in each station, the desired date of a conference may be temporarily stored in the RAM of the calendar clock 24. In determining the expected date of the next conference at the end of the conference, desired conference dates may be designated at predetermined portions of a calendar transmitted to the partner's terminal. In this case, the time difference conversion circuits 26 in the respective stations are designed to collate the desired conference dates with each other so that overlapping desired dates can be automatically and identifiably displayed on the calendars on the submonitors in the respective stations.

Similarly, in each station, the time difference conversion circuit 26 may have a function of identifiably displaying a day time zone in each country, e.g., from 8:30 A.M. to 6:00 P.M., on the calendar of a partner's station.

In the above embodiment, date information and country ID information are transmitted to a partner's terminal. It is, however, apparent that the country ID information of a communication partner may be identified at the beginning of communication, and date information of the self terminal may be transmitted to the partner's terminal upon conversion of the date information.

An embodiment in which the above embodiments are applied to an inter-multipoints TV conference system will be described next.

Figure 8:
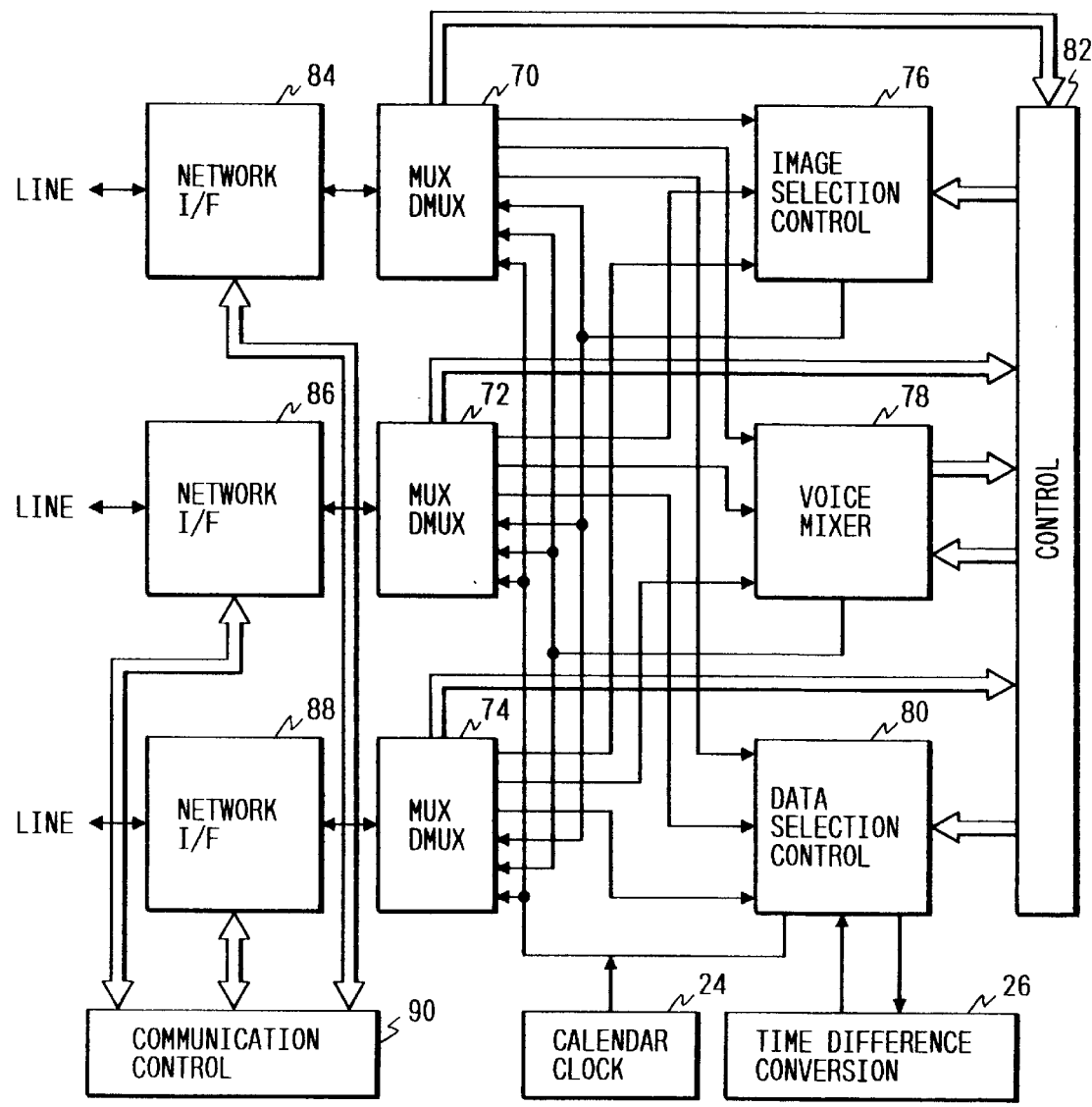
FIG. 8 is a block diagram showing the arrangement of an inter-multipoints connection control unit 60 according to the embodiment.
Figure 9:
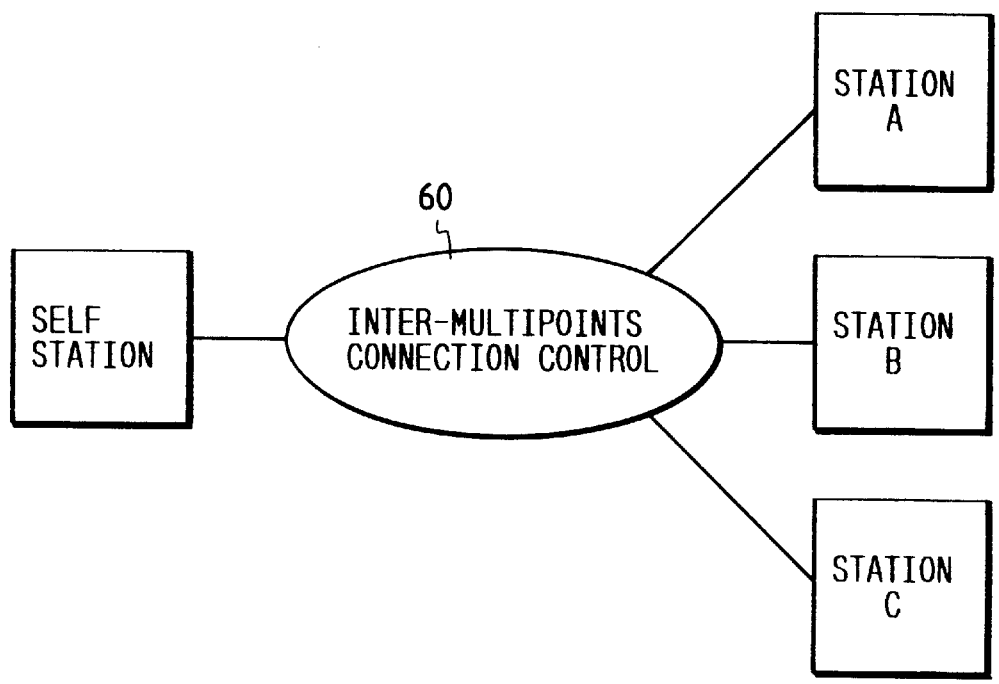
FIG. 9 is a block diagram showing the overall arrangement of an inter-multipoints connection TV conference system according to the embodiment.

When a TV conference is to be held upon interconnecting three or more points, a star connection scheme is employed, as shown in FIG. 9. In this case, an inter-multipoints connection control unit 60 is required. FIG. 8 shows the detailed arrangement of the inter-multipoints connection control unit 60.

Referring to FIG. 8, multiplexing/demultiplexing circuits 70, 72, and 74 multiplex and demultiplex information (image information, voice information, and the like) to be transmitted. An image selection control circuit 76 selects data to be distributed from individual stations. A voice mixer 78 synthesizes voice data from the individual stations. A data selection control circuit 80 selects and distributes data such as still picture data and computer data. A control circuit 82 controls the image selection control circuit 76, the voice mixer 78, and the data selection control circuit 80.

Network I/Fs 84, 86, and 88 serve to connect the apparatus shown in FIG. 8 to communication networks. A communication control unit 90 controls network access to each station. Similar to FIG. 1, this system includes a calendar clock 24 and a time difference conversion circuit 26.

In this case, the terminal of each station need not have the calendar clock 24 and the time difference conversion circuit 26 and may transmit only ID information indicating the country or area of the self station or a partner's station to the inter-multipoints connection control unit 60. The calendar clock 24 of the inter-multipoints connection control unit 60 counts only one kind of standard time, e.g., Greenwich mean time. Calendar data is converted by the time difference conversion circuit 26 on the basis of ID information transmitted from each station, and the calendar data is transmitted thereto.

Pieces of such ID information may be communicated between the respective terminals at the beginning of a conference so that each terminal can recognize the ID information of the partner's terminal. In this case, if a given terminal requests the calendar data of a given country or area, ID information indicating the country or area may be transmitted to the inter-multipoints connection control unit 60. With this operation, a terminal in each station can extract the calendar data of any country or area from the inter-multipoints connection control unit 60 in accordance with ID information, regardless of where the corresponding station participates in a conference, and can display the calendar data on a monitor in a station which requests it. If each station includes the calendar clock 24 and the time difference conversion circuit 26, each station can cause the inter-multipoints connection control unit 60 to perform a similar operation, in addition to the above operation.

The above calendar data is calculated by a computer program for producing a calendar in consideration of an arbitrary year, e.g., a leap year. The above time difference data is calculated from Greenwich mean time in each country. Therefore, pieces of information unique to each country or area, e.g., public holidays, holidays, and summer time, may be set in the calendar clock and the time difference conversion circuit in advance for each country.

As described above, in holding a conference, calendar data is displayed on the monitor in the self station in accordance with the operation of the operation unit, while the calendar data is converted in the partner's station in consideration of a time difference, thereby facilitating schedule adjustment and saving a communication time. In addition, calendar data received from the partner's station can be displayed without performing time difference conversion so that each station can perform schedule adjustment while checking local times in the partner's station. Since a given user can perform schedule adjustment upon checking expected conference terminal operation information, the operation schedule of the user does not overlap the operation schedules of other users. In addition, a schedule written in the electronic notebook of each user can be input to the system through the interface, schedule adjustment can be performed in accordance with the priorities of schedules. Since each station can send only scheduled times to the partner's station while masking the detailed contents of the schedule, private information can be protected against the communication partner. Moreover, overlapping desired dates can be automatically and identifiably displayed on the terminals in the respective stations to save communications for schedule adjustment. Although a TV conference system has been described above, it is apparent that the present invention can be applied to any communication terminal system.

What is claimed is:

1. A communication conference system for performing communications between a plurality of communication terminal apparatuses via a communication control unit, wherein, each said communication terminal apparatus includes:
  transmitting means for transmitting ID information of said terminal apparatus itself and a communication partner, wherein the ID information includes country information; and
  receiving means for receiving date data generated in said communication control unit in accordance with the ID information transmitted by said transmitting means, and said communication control unit includes:
  receiving means for receiving the ID information from said communication terminal apparatus;
  generating means for generating date data of a country corresponding to the ID information of said communication terminal apparatus itself which performed the transmission; and
  transmitting means for transmitting the generated date data to the communication terminal apparatus being the communication partner,
  wherein the date data of said country is calendar information, and wherein the calendar information includes a holiday and a public holiday of said country.

2. A system according to claim 1, further comprising conversion means for converting the date data received by said receiving means into date data corresponding to a self station.

3. A system according to claim 1, wherein the date data is time information.

4. A system according to claim 1, wherein said generating means generates the date data on the basis of summer time or a time difference.

5. A system according to claim 1, wherein the communication includes communication of at least image data.

6. A communication terminal apparatus for performing communications with another apparatus via a communication control unit, said communication terminal apparatus comprising:

transmitting means for transmitting ID information representing a desired communication partner, to said communication control unit, wherein the ID information includes country information; and receiving means for receiving date data of a communication partner's country generated by a generation means in said communication control unit in accordance with the ID information transmitted, wherein the date data is calendar information, and wherein the calendar information includes a holiday and a public holiday of the communication partner's country.

7. An apparatus according to claim 6, wherein the date data is time information.

8. An apparatus according to claim 6, wherein said generating means generates the date data on the basis of summer time or a time difference.

9. A communication control unit which transmits information from a first communication terminal apparatus to a second communication terminal apparatus, comprising:

reception means for receiving ID information of said first communication terminal apparatus or ID information of said second communication terminal apparatus, from said first communication terminal apparatus, the ID information including country information;

generation means for generating calendar information corresponding to the country information included in the ID information received by said reception means, the calendar information including public holidays corresponding to the country information; and transmission means for transmitting to said second communication terminal apparatus the calendar information generated by said generation means in correspondence with the country information included in the ID information of said first communication terminal apparatus, or for transmitting to said first communication terminal apparatus the calendar information generated by said generation means in correspondence with the country information included in the ID information of said second communication terminal apparatus.

10. A communication control unit according to claim 9, wherein said generation means has a table which stores the calendar information based on a time difference corresponding to the plural country information.

11. A communication control unit according to claim 9, wherein said generation means generates the calendar information based on a time difference corresponding to the country information.

12. A communication conference method for performing communications between a plurality of communication terminal apparatuses via a communication control unit, comprising the steps of:

transmitting ID information of the terminal apparatus itself and a communication partner from the communication terminal apparatus to the communication control unit, wherein the ID information includes country information;

receiving the ID information from the communication terminal apparatus in the communication control unit;

generating date data of a country corresponding to the ID information of the communication terminal apparatus itself in the communication control unit which apparatus performed the transmission; and transmitting the generated date data to the communication terminal apparatus in the communication control unit which apparatus is the communication partner, wherein the date data of the country is calendar information, and wherein the calendar information includes a holiday and a public holiday of the country, and receiving means is provided to receive the date data generated in the communication control unit in accordance with the ID information transmitted in transmitting means in the communication terminal apparatus being the communication partner.

13. A communication method for a communication terminal apparatus which performs communications with another apparatus via a communication control unit, said method comprising the steps of:

transmitting ID information representing a desired communication partner, to the communication control unit, wherein the ID information includes country information; and receiving date data of a communication partner's country generated in the communication control unit in accordance with the ID information transmitted, wherein the date data is calendar information, and wherein the calendar information includes a holiday and a public holiday of the communication partner's country.

14. A communication method for a communication control unit which transmits information from a first communication terminal apparatus to a second communication terminal apparatus, said method comprising the steps of:

receiving ID information of the first communication terminal apparatus or ID information of the second communication terminal apparatus, from the first communication terminal apparatus, the ID information including country information;

generating calendar information corresponding to the country information included in the ID information received in said reception step, the calendar information including public holidays corresponding to the country information; and transmitting to the second communication terminal apparatus the calendar information generated in said generation step in correspondence with the country information included in the ID information of the first communication terminal apparatus, or for transmitting to the first communication terminal apparatus the calendar information generated in said generation step in correspondence with the country information included in the ID information of the second communication terminal apparatus.

15. A storage medium containing computer-readable code for performing a communication conference method for communication between a plurality of communication terminal apparatuses via a communication control unit, the computer-readable code comprising the steps of:

transmitting ID information of the terminal apparatus itself and a communication partner from the communication terminal apparatus to the communication control unit, wherein the ID information includes country information;

receiving ID information from the communication terminal apparatus in the communication control unit;

generating date data of a country corresponding to the ID information of the communication terminal apparatus itself in the communication control unit which apparatus performed the transmission; and transmitting the generated date data to the communication terminal apparatus in the communication control unit which apparatus is the communication partner, wherein the date data of the country is calendar information, and wherein the calendar information includes a holiday and a public holiday of the country, and receiving means is provided to receive the date data generated in the communication control unit in accordance with the ID information transmitted in transmitting means in the communication terminal apparatus being the communication partner.

16. A storage medium containing computer-readable code for performing a communication method for a communication terminal apparatus which performs communications with another apparatus via a communication control unit, the computer-readable code causing the communication terminal apparatus to perform the function of:

transmitting ID information representing a desired communication partner, to the communication control unit, wherein the ID information includes country information; and receiving date data of a communication partner's country generated in the communication control unit in accordance with the ID information transmitted, wherein the date data is calendar information, and wherein the calendar information includes a holiday and a public holiday of the communication partner's country.

17. A storage medium containing computer-readable code for performing a communication method for a communication control unit which transmits information from a first communication terminal apparatus to a second communication terminal apparatus, the computer-readable code causing the communication control unit to perform the functions of:

receiving ID information of the first communication terminal apparatus or ID information of the second communication terminal apparatus, from the first communication terminal apparatus, the ID information including country information;

generating calendar information corresponding to the country information included in the ID information received in said reception step, the calendar information including public holidays corresponding to the country information; and transmitting to the second communication terminal apparatus the calendar information generated in said generation step in correspondence with the country information included in the ID information of the first communication terminal apparatus, or for transmitting to the first communication terminal apparatus the calendar information generated in said generation step in correspondence with the country information included in the ID information of the second communication terminal apparatus.

* * * * *

UNITED STATES PATENT AND TRADEMARK OFFICE
CERTIFICATE OF CORRECTION

PATENT NO.    : 6,205,089 B1
DATED         : March 20, 2001
INVENTOR(S)   : Kan Itoh It is certified that error appears in the above-identified patent and that said Letters Patent is hereby corrected as shown below:

<u>Title page,</u>
U.S. PATENT DOCUMENTS,
"McGaughey et al." should read -- "McGaughey III et al. --
"Klaussner et al." should read -- Klausner et al. --
"Neddle et al." should read -- Nepple et al. --

FOREIGN PATENT DOCUMENTS,
"6225301" should read -- 6-255301 --

Signed and Sealed this

Eighteenth Day of June, 2002

*Attest:*

JAMES E. ROGAN
*Attesting Officer*           *Director of the United States Patent and Trademark Office*